United States Patent
Yim et al.

(10) Patent No.: US 11,294,230 B2
(45) Date of Patent: Apr. 5, 2022

(54) LIGHT GUIDE UNIT HAVING SHIELDING PORTION, BACKLIGHT MODULE USING THE SAME AND MANUFACTURING METHOD OF LIGHT GUIDE UNIT

(71) Applicant: LMS Co., Ltd., Pyeongtaek-si (KR)

(72) Inventors: Ju Hyuk Yim, Suwon-si (KR); Se Jin Oh, Hwaseong-si (KR); Young Il Kim, Seongnam-si (KR); Jee Hong Min, Seongnam-si (KR); Byeong Cheol Kim, Osan-si (KR); Ji Yeon Hong, Yongin-si (KR); Ha Young Jang, Osan-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/618,316

(22) PCT Filed: May 17, 2018

(86) PCT No.: PCT/KR2018/005656
§ 371 (c)(1),
(2) Date: Nov. 29, 2019

(87) PCT Pub. No.: WO2018/221878
PCT Pub. Date: Dec. 6, 2018

(65) Prior Publication Data
US 2020/0117052 A1    Apr. 16, 2020

(30) Foreign Application Priority Data

May 29, 2017    (KR) .................. 10-2017-0065912

(51) Int. Cl.
*G02F 1/13357* (2006.01)
*F21V 8/00* (2006.01)
*G02F 1/1335* (2006.01)

(52) U.S. Cl.
CPC ....... *G02F 1/133605* (2013.01); *G02B 6/005* (2013.01); *G02B 6/0051* (2013.01);
(Continued)

(58) Field of Classification Search
CPC ......... G02F 1/133605; G02F 1/133512; G02F 1/133615; G02B 6/0051; G02B 6/0066;
(Continued)

(56) References Cited

U.S. PATENT DOCUMENTS

2008/0291696 A1    11/2008  Kim et al.
2013/0021558 A1*    1/2013  Momose .............. G02B 6/0031
                                                    349/65

(Continued)

FOREIGN PATENT DOCUMENTS

CN        103091739 A     5/2013
JP        2012-215621 A   11/2012
(Continued)

OTHER PUBLICATIONS

Chinese Office Action dated Jun. 16, 2020 issued in corresponding Patent Application No. 201880035978.8 (14 pages).
(Continued)

*Primary Examiner* — Rajarshi Chakraborty
*Assistant Examiner* — Nathaniel J Lee
(74) *Attorney, Agent, or Firm* — Polsinelli PC (57) ABSTRACT

The present invention provides a backlight module comprising a light emitting unit including a light source and a light guide plate transmitting light from the light source; a light guide unit accumulatively placed on the top of the light emitting unit and transmitting the light to the upper part of the light guide unit; a mold frame containing the light emitting unit and the light guide unit and having a space between the side of the light guide unit and the mold frame; and a shielding portion formed at the side of the light guide
(Continued)

unit to prevent light leakage transmitting from the side of the light guide unit to the outside of the light guide unit.

17 Claims, 11 Drawing Sheets

(52) U.S. Cl.
CPC .......... *G02B 6/0055* (2013.01); *G02B 6/0076* (2013.01); *G02B 6/0088* (2013.01); *G02B 6/0091* (2013.01); *G02F 1/133512* (2013.01); *G02F 1/133615* (2013.01)

(58) Field of Classification Search
CPC .... G02B 6/0076; G02B 6/0091; G02B 6/005; G02B 6/0088; G02B 6/133512; G02B 6/133615; G02B 6/133605; G02B 6/0055
See application file for complete search history.

(56) References Cited

U.S. PATENT DOCUMENTS

| 2014/0016348 A1* | 1/2014 | Iwasaki | G02B 6/0041 |
| | | | 362/606 |
| 2016/0085109 A1* | 3/2016 | Baek | G02B 6/0088 |
| | | | 362/607 |

FOREIGN PATENT DOCUMENTS

| KR | 10-2009-0053087 A | 5/2009 |
| KR | 10-2014-0124570 A | 10/2014 |
| WO | WO 2014/094321 A1 | 6/2014 |

OTHER PUBLICATIONS

International Search Report from International Application No. PCT/KR2018/005656 dated Sep. 14, 2018 in 3 pages.

* cited by examiner

LIGHT GUIDE UNIT HAVING SHIELDING PORTION, BACKLIGHT MODULE USING THE SAME AND MANUFACTURING METHOD OF LIGHT GUIDE UNIT

CROSS-REFERENCE TO RELATED APPLICATION(S)

This application is a National Phase Entry of PCT International Application No. PCT/KR2018/005656 which was filed on May 17, 2018, and claims priority to Korean Patent Application No. 10-2017-0065912, which was filed on May 29, 2017, the contents of which are incorporated herein by reference.

BACKGROUND

1. Field

The present invention relates to a light guide unit having shielding portion, and a backlight module using the same and manufacturing method of the light guide unit, and more particularly relates to a light guide unit having a shielding portion which shields light leaked from the backlight module through the side of the light guide unit, the backlight module using the same, and manufacturing method of the light guide unit.

2. Description of the Related Art

In recent years, the use of flat-panel display panels have been expanded and one of them is a liquid crystal display (LCD) panel as a representative panel.

Generally, a LCD requires a backlight module that provides uniform light throughout the screen, unlike conventional CRTs.

A conventional backlight module includes a lamp as a linear light source and a lamp reflecting plate disposed at the side of a light guide plate for changing the linear light source from the lamp to a surface light source, a reflecting sheet for preventing light loss placed under the light guide plate, and a prism sheet with a plurality of triangular shape of linearly arranged prisms is placed to condense a scattered light.

A backlight module which contains configurations stated above also includes a mold frame retaining its appearance and the light guide plate and the prism sheet are placed inside.

In this case, a light leakage occurs through a space between the prism sheet and the mold frame in a process where the light transmitted from the light guide plate is condensed and diffused.

In a case where the light is leaked, the light is also leaked through the side of a liquid crystal panel thereby not only interfering the user's vision but also causing a problem of deteriorating the overall brightness of the panel.

Of course, the light can be shielded if a bezel located on the top of the liquid crystal display panel is large enough, but such bezel cannot solve the problem since the size of the bezel for the LCD panel is tend to be small in recent years.

To solve this problem, a laid-open Korea patent application (10-2010-0138216) discloses a diffuser plate extended in the direction of a light source and a shielding member placed on the top of an extend space of the diffuser plate. In this case, the shielding member can be a shielding tape or a non-transparent material member thereby shielding the light leakage caused by a light incident to the side of an optical sheet.

In addition, a laid-open Korea patent application (10-2014-0114916) discloses a member for shielding the light leakage assembled to at least one or an opposite side of an optical member surrounding the outside of the backlight module.

However, there is a problem to change a structure of the backlight module to include an additional member for shielding the light leakage as stated above and there is still light leakage problem when the bezel is minimized like a narrow-bezel and a bezelless because a configuration to add the member for shielding the light leakage on one or the opposite side of the optical member is not formed directly on a sheet that causes the light leakage.

As a result, it is necessary to develop a light guide unit that can directly shield light leakage outside through the side of a prism sheet and a diffuser sheet without any structural changes of a backlight module.

SUMMARY

To solve a problem as stated above, a task of the present invention is to offer a light guide unit having a shielding portion directly additionally formed at the side of the light guide unit thereby shielding light leakage through a space between the light guide unit and a mold frame of the LCD panel and a method of manufacturing the light guide unit and a backlight module using the light guide unit.

To solve the problem as stated above, the present invention offers a backlight module comprises a light emitting unit including a light source and a light guide plate transmitting light from said light source to an upper part of the light guide plate, a light guide unit placed above light emitting unit and transmitting said light from a bottom part of the light guide unit to an upper part of the light guide unit, a mold frame containing said light emitting unit and said light guide unit and said mold frame formed to be apart from a side of said light guide unit, and a shielding portion formed at the side of said light guide unit preventing a light leakage transmitted from said side of said light guide unit to an outside of said light guide unit.

In addition, the light guide unit is constructed to have a plurality of sheets accumulatively formed with a preset height and at least one side of each sheet may have the shielding portion.

Furthermore, the light guide unit is constructed to have at least one or more of a light condensing sheet condensing light from a bottom part of the light condensing sheet and then transmitting to an upper part of the light condensing sheet, or a diffuser sheet diffusing light from a bottom part of the diffuser sheet and transmitting to an upper part of the diffuser sheet.

The light guide unit also comprises a plurality of sheets having a structured pattern laminated.

The shielding portion also is a portion penetrated between the structured patterns of the laminated sheets and then hardened.

Furthermore, the backlight module comprises a reflector placed between the shielding portion and the side of the light guide unit, and reflecting the light transmitted from the lower part of the backlight module to the inside of the light guide unit.

The shielding portion further includes a color ink and shields light leakage from the side of the light guide unit to the outside of said light guide unit.

The shielding portion is formed along a certain part of the side of the light guide unit.

In addition, the shielding portion comprises a photopolymer resin or a thermosetting resin.

According to another aspect of the present invention to solve aforementioned problem, the light guide unit, placed on the above of a light emitting unit including a light guide plate transmitting light to the upper part, includes a sheet having a flat base film with a preset thickness, structured patterns for condensing or diffusion the light transmitted from the bottom part of said base film and a shielding portion formed on the top or the bottom of the base film and shields a leakage of light transmitted from the side of the base film to the outside of said base film.

It may also include reflectors that are placed between the shielding portion and the side of the base film, and reflect light to inside.

In addition, the shielding portion contains a color ink inside and shields light leakage from the side of the base film.

In addition, the shielding portion may be formed along the side of the base film.

In addition, the shielding portion may comprise a photopolymer resin or a thermosetting resin.

Furthermore, according to another aspect of the present invention for a method for manufacturing of another light guide unit to solve the problem as stated above, the method provides a preparation step for subsequently and accumulatively placing a plurality of light guide units comprising a plurality of structured patterns, a forming step for continuously forming a shielding portion on the side of the plurality of the light guide units, a hardening step for hardening the shielding portion, and a separation step for separating the plurality of the light guide unit in which said light shielding portion is hardened respectively.

In addition, an additional reflector forming step may be included to formed separate reflectors to the side of the accumulated light guide units.

In addition, during the forming step, the shielding portion may be placed on a forming device where the size of the shielding portion is set in advance and a side of the light guide unit contact with the forming device each other thereby transposing and forming the shielding portion.

To address the problems above, the present invention has the following effects.

First, the present invention has the advantage of blocking the light leakage through a space between the mold frame and the light guide unit by having a separate shielding portion formed at the side of the light guide unit that diffuses and condenses the light from a light emitting unit to the upper part.

Second, since the shielding portion is formed with ink at the side of the light guide unit, there is no variation in the shape of the light guide unit, and therefore there is an advantage that can be applied without changing for the existing structure.

The effects of this invention are not limited to the aforementioned effects, and other effects not mentioned will be clearly understood by one of ordinary skilled in the art within the scope of the claim of the invention.

DETAILED DESCRIPTION

The following is a detailed description of the preferred embodiment of the present invention in which the purpose of this invention can be realized along with referring to the attached drawings. In explaining the embodiment, the same name and the same symbol are used for the same configuration, and additional explanations are omitted.

A light guide unit according to one embodiment of the present invention is described as an example for utilizing a backlight module for a flat panel such as liquid crystal display (LCD) or a LED panel. However, the present invention is not necessarily limited to this embodiment, it may be used solely by the light guide unit, or it may be a backlight module that is not applicable to LCDs, or it may be applied to any device that changes the light characteristics and pathways, such as a lighting equipment.

Figure 1:
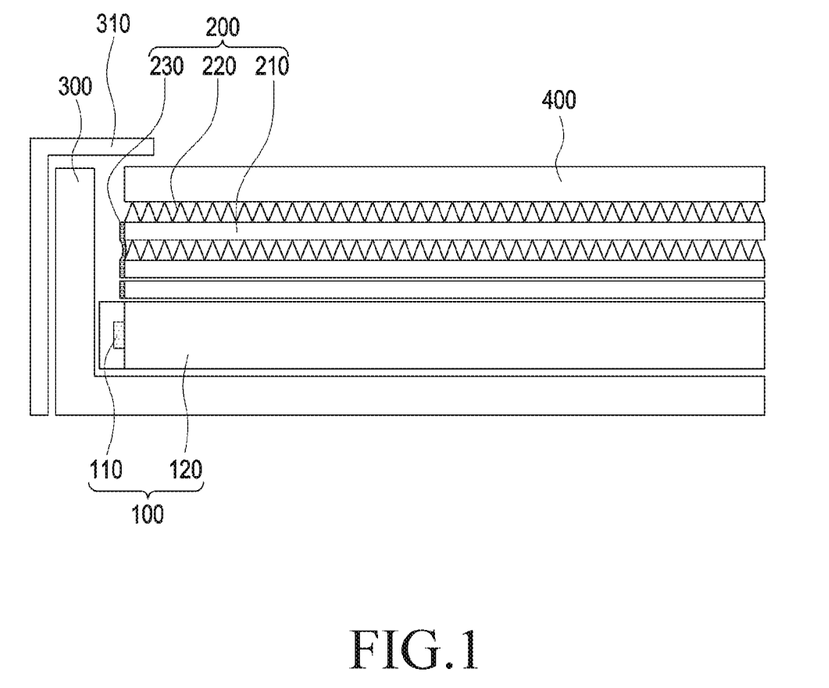
FIG. 1 is a schematic diagram disclosing the configuration of a backlight module comprising a light guide unit according to embodiments the present invention.
Figure 2:
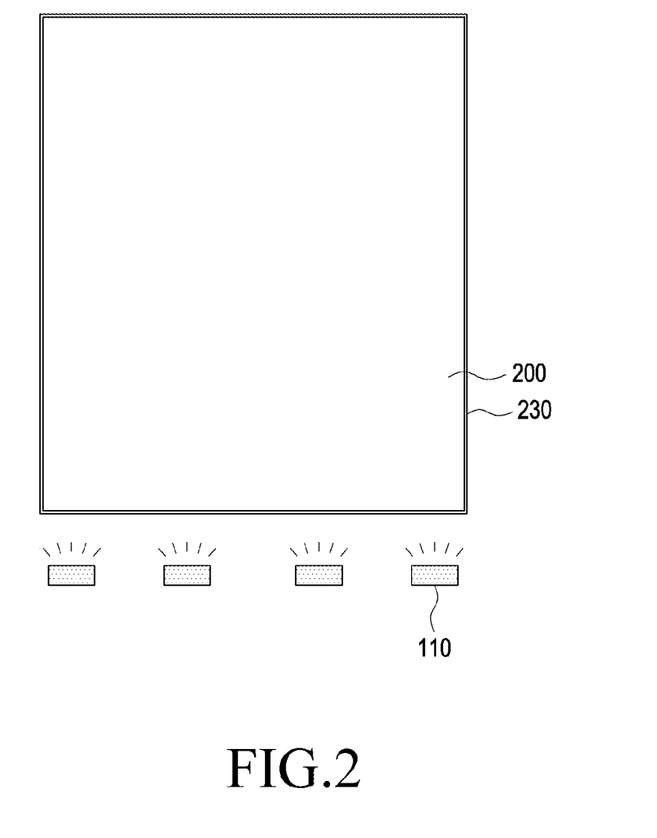
FIG. 2 is schematic diagram disclosing the light guide unit in the backlight module in FIG. 1.
Figure 3:
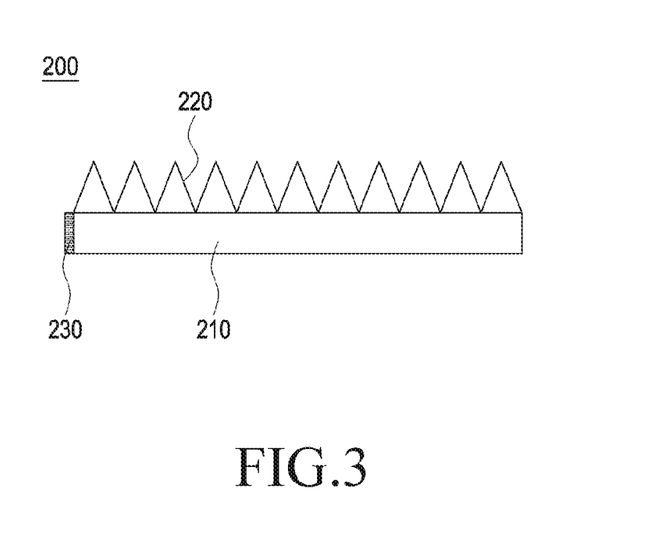
FIG. 3 is a schematic diagram disclosing a shielding portion in the light guide unit in FIG. 2.

First, the following is an overview of the backlight module configuration according to the present invention, referring to FIGS. 1 to 3.

FIG. 1 is a schematic diagram of the configuration of a backlight module comprising a light guide unit according to embodiments of the present invention, FIG. 2 is a diagram showing the configuration of the light guide unit in the backlight module in FIG. 1, and FIG. 3 is a drawing of a shielding portion formed on the light guide unit.

In general, when constructing a liquid crystal display, the LCD panel (400) is essentially required to have a backlight module (BLU) providing light.

This backlight module comprises a light emitting unit (100), a light guide unit (200) and a mold frame (300).

The light emitting unit (100) transforms the light into the form of a surface light source and transmits it to the upper part. Also, the light emitting unit (100) comprises a light source (110) and a light guide plate (120).

The light source (110) normally generates light from the sidewall (120) of the light guide plate (120) and transmits the light to the light guide plate (120). The light source (110) may be optionally selected from a Light Emitting Diode (LED) and Cold Cathode Fluorescent Lamps (CCFL).

Specifically, the light source (110) may be consisted of at least one or more light sources and emit light towards the side of the light guide plate (120).

The incident light to the light guide plate (120) makes a total reflection at the inside of the light guide plate (120) and the light incident with an incident angle smaller than a critical incident angle to the surface of the light guide plate (120) does not make a total reflection but transmitting to the upper part.

The light guide plate (120) may also comprise a separate reflecting plate on the lower part, which reflects light transmitted from the inside of the light guide plate (120) to the outside and then re-incidents the reflected light to the light guide plate (120) so that it configures to increase the light transmission efficiency.

As such, the light emitting unit (100) is configured and the light transmitted from a light source (110) is transmitted to a light guide unit (200) above as a surface light source by the light guide plate (120).

Meanwhile, the light guide unit (200) is disposed at the top of the light emitting unit (100) and condenses and diffuses the light.

In general, the light guide unit (200) is configured to transmit the light from the light emitting unit (100) to the upper part and condenses and diffuses.

In this case, the light guide unit (200) may comprise a plurality of sheets, such as a prism sheet and a diffuser sheet is accumulatively formed or laminated, and furthermore it may comprise two or more prism sheets and diffuser sheets accumulatively laminated. The sheets in this case is made of a transparent material thereby condensing or diffusing light.

In the present invention, the light guide unit (200) comprises a base film (210), a structured pattern (220) and a shielding portion (230).

The base film (210) has a preset thickness and is formed as flat, thus is constructed to allow the transmission of light from the lower part and a structured pattern (220) can be formed either upper surface or lower surface of the base film (210).

The above structured pattern (220) is formed on either upper surface or lower surface of the base film (210) and it condenses or diffuses the light transmitted from the lower part.

And, the shielding portion (230) is formed at the side of the light guide unit (200), thus to prevent the inside light leaking through the side to the outside.

Here, in FIG. 2, with the reference to the light source (110), it is defined that a left side of the light guide unit (200) is a first side, a right side is a second side, a further side apart from the light source (110) is a third side and a adjacently facing side from the light source (110) is a fourth side. Then, the shielding portion (230) is formed either at all side including the first side through the fourth side or on the first side and second side.

Also, when the shielding portion (230) is formed in the light guide unit (200), it is not limited to two types as stated above, it may be formed at one or more sides selected from the first side through the fourth side depending on its design according to the usage.

Such shielding portion (230) may be formed at a certain portion of side of the base film (210) thereby being constructed to prevent light leakage from the side of the light guide unit (200).

i. Here, the shielding portion (230) contains color ink inside, such as white or black ink and is consisted of thermosetting resin or photopolymer resin.

The light guide unit (200) as such may comprise a plurality of sheets with a preset thickness in a vertical direction and layered and the shielding portion (230) is formed at least one side of each sheet.

The light guide unit (200) may include a plurality of sheets laminated and according to the embodiment, it is constructed to include light condensing sheets and diffuser sheets.

The diffuser sheet is placed on the upper part of the light guide plate (120) to diffuse light and a structured pattern (220) is formed at least one on either the upper or lower surface in irregular fashion so as to diffuse the light.

The structured pattern formed on the diffuser sheet has spherical shape protrusions with the irregular size so as to diffuse the light.

On the other hand, the light condensing sheet is layered or laminated on the top of the diffuser sheet to condense the transmitted light and transmitting to the upper part. In this instance, the light condensing sheet can be a single type reverse prism sheet or a plurality of layered prism sheets or layered prism sheets laminated.

And, as such, the light condensing sheet condenses the light by refracting the light transmitted from the diffuser sheet.

In this preferred embodiment, the light condensing sheet comprises a plurality of prism structures as a structured pattern (220).

According to the present invention as such, a light guide unit (200) comprises a base film (210) with a preset thickness, a structured pattern (220) formed on the base film (210) and condensing or diffusing light, and a shielding portion (230) formed on the side of the base film (210) thereby preventing inside light leaking through the side.

In addition, a mold frame (300) is to surround the bottom part of a light emitting unit (100) and the side part of the light guide unit (200) and to maintain the appearance, to contain the light emitting unit (100) and the light guide unit (200) inside, and to surround the side while being apart from the side of the light guide unit (200).

Specifically, the mold frame (300) protects the light emitting unit (100) and the light guide unit (200) while maintaining the appearance of the backlight module, and may additionally accommodate a separate liquid crystal panel (400).

As such, the mold frame (300) is constructed and a bezel (310) is formed on the upper part of the mold frame (300).

As illustrated in the drawing, the bezel (310) is formed to shield the side of the transmitting unit by covering from the top of a certain side portion of the mold frame (300) and the light guide unit (200).

Here, the bezel (310) is formed along the side of the light guide unit (200) in the liquid crystal display thereby shielding the light leaked at the upper part.

According to the present invention as such, the backlight module comprises a light emitting unit (100), a light guide unit (200), and a mold frame (300), and the light guide unit (200) further has a separate shielding portion (230) to prevent light leakage between the light guide unit (200) and the mold frame (300).

Specifically, the leakage light is observed depending on the presence or absence of any shielding portion (230) with the reference to FIGS. 4 to 6 and is described as follows.

Figure 4:
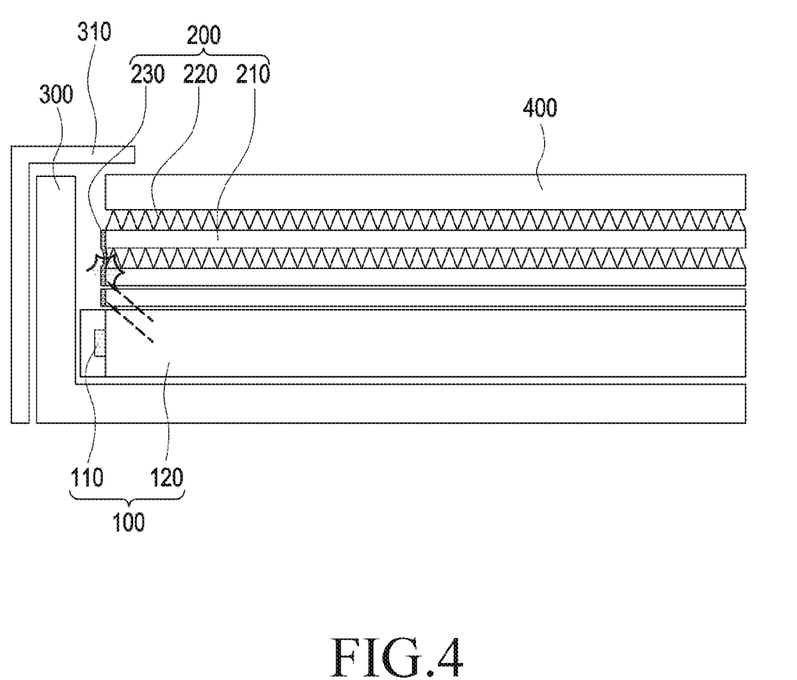
FIG. 4 is a schematic diagram showing a status of shielding light leakage effect by the shielding portion in the backlight module comprising the light guide unit in FIG. 1.

FIG. 4 is a drawing showing the condition in which light leakage is prevented by a shielding portion (230) formed on the light guide unit (200) in the backlight according to FIG.

Figure 5:
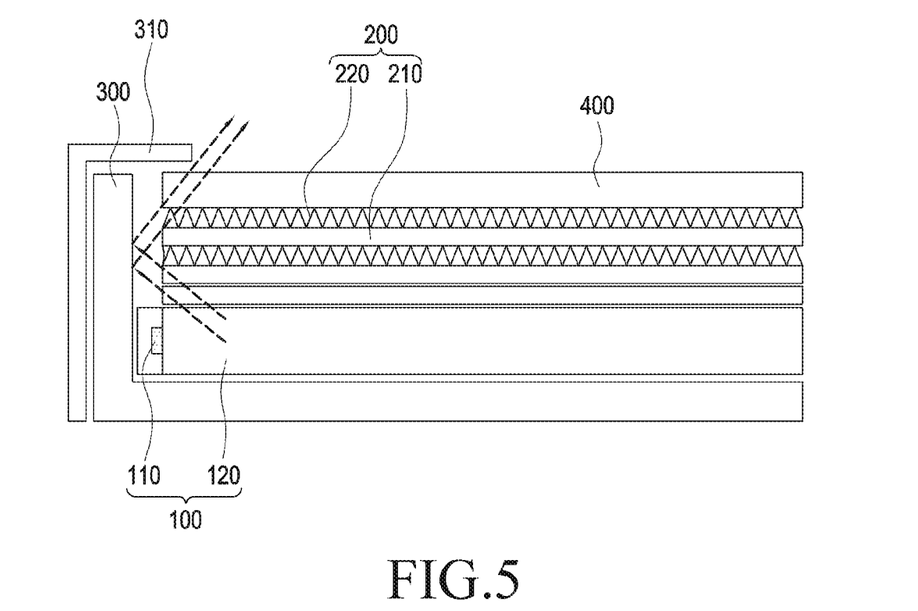
FIG. 5 is a schematic diagram showing a status of the light leakage effect without a shielding portion in FIG. 4.
Figure 6:
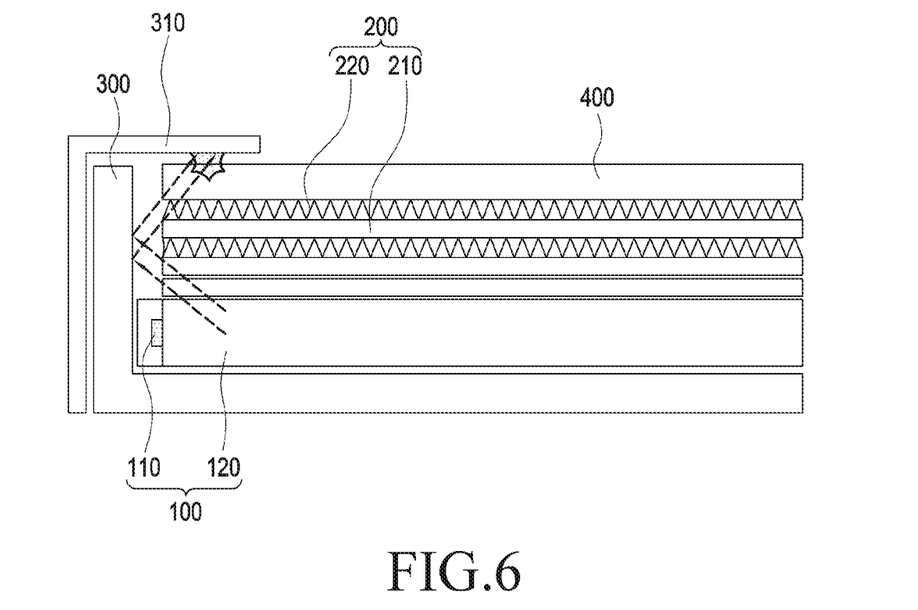
FIG. 6 is a schematic diagram showing a status of shielding light leakage effect where a length of a bezel is elongated in a conventional backlight module.

FIG. 5 shows the condition where the light leakage occurs in the absence of the shielding portion (230) in FIG. 4, and FIG. 6 shows a bezel in a conventional backlight module is formed to cover the panel thereby preventing the light leakage.

At first, in FIGS. 5 and 6, although the basic configuration is similar to the embodiment of the present invention, the shielding portion (230) is not available in the light guide unit (200).

In this case, the light from the light emitting unit (100) is also transmitted via the diffuser sheet and the light condensing sheet to the upper part. However, some light is leaked through the side to a space between the mold frame (300) and the light guide unit (200).

Such leaked light transmits to the upper part and interferes with the user's vision.

Generally, a backlight module for a liquid crystal displays leaks light from the light source (110) to the side of the light guide unit (200), and the light leakage transmits outward through a space between the mold frame (300) and the light guide unit (200).

To solve the problem, the bezel (310) is formed in a protruding fashion in the direction of the liquid crystal panel (400) as previously illustrated in FIG. 6 to block light leakage into the space between the light guide unit (200) and the mold frame (300).

In FIG. 6, a bezel (310) is used for one example of a conventional backlight module and is also formed relatively long compared to the backlight module in FIG. 5.

Specifically, even if some light transmitted from the lower part through the side of the light guide unit (200) is not condensed thereby being leaked and transmitted to the upper part through the mold frame (300) in between, the bezel (310) blocks this from the upper part thereby preventing from being transmitted to the user's view.

In the conventional backlight module, the bezel (310) is formed in a protruding with relatively long fashion to block light leakage into the space between the light guide unit (200) and the mold frame (300).

However, in recent development of the LCD panel, a size of the bezel (310) is decreased to increase the LCD panel (400) size so as to utilize the maximum viewing area from the panel.

Therefore, the size of the bezel (310) in the form surrounding the side of the liquid crystal panel (400) becomes smaller and the smaller the bezel (310), the more difficult to block the light leakage through the space between the liquid crystal panel (400) and the mold frame (300).

In particular, display panels with only minimal blocking area remaining, which are also called as a Narrow Bezel or a Zero Bezel, have recently been released and as a result, a problem of light leakage phenomena is increased.

Specifically, in case where the size of the bezel (310) is reduced without having an independent shielding portion (230) as illustrated in FIG. 5, it cannot be prevented from leaking light through a space between the light transmission unit (200) and the mold frame (300).

To solve the problem by a conventional method described in prior art references, there is a burden to change the structure of the backlight unit or to change/add a process of a formation of the sheet for the transmitting unit during a manufacturing process.

However, as shown in FIG. 4, according to the present invention, a shielding portion (230) is formed at the side of the base film (210) in the light guide unit (200) to prevent the light leakage.

Specifically, in the present invention, the shielding portion (230) is formed at the side of the base film (210) to prevent leaking light transmitted from the lower part through the inside of the base film (210) to the outside.

Here, the base film (210) is a sheet with a preset thickness thus to have a side and some light incident from the lower part may not be transmitted to the upper part but the side.

At this time, the shielding portion (230) is formed at the side of the base film (210) to prevent inside light traversing to the side of the base film (210) from leaking to the outside.

Unlike a previously suggested method where utilizing the longer length bezel (310) or providing an independent light shielding member placed between a mold frame (100) and a light guide unit (200), it is to require the base film (210) comprising the shielding portion (230) thereby preventing light leakage from the side of the base film (210).

Unlike the previously suggested method, the present invention is to prevent light leaking caused by light coming inside of the sheets to the outside by forming the shielding portion (300) on the side of the light condensing sheet and the diffuser sheet which are the light guide unit (200).

Accordingly, the light guide unit (200) is constructed to minimize the light from the lower part to leak to cause a light loss. Therefore, having additional members between the mold frame (100) and the light guide unit (200) or changing the structure of the mold frame (100) are not necessary. Moreover, it is possible to apply immediately to a currently utilizing process.

As such, in the present patent application, it is possible to prevent the light leakage itself from the side of the light guide unit (200) by forming the shielding portion (300) on the side of the light guide unit (200).

In addition, in case where the light guide unit (200) comprising a plurality of sheets layered of laminated, the shielding portion (230) may be formed at the space between the structured pattern (220) formed on the plurality of the sheets and the base film (210) thereby preventing the light leakage through the structured pattern (220) to the outside.

The present invention reduces the light leakage itself from the side by providing the shielding portion (230) in the light guide unit (200). Accordingly, it is possible to minimize the light traverse through a space between the light guide unit (200) and the mold frame (300).

In this case, apart from blocking the light leakage through the bezel (310), the present invention provides the shielding portion (230) in the light guide unit (200) to block the light leakage regardless of the size of the bezel (310).

Therefore, even if the size of the bezel (310) is minimized following the current trend, it is possible to minimize the light leakage along the side of the liquid crystal display by blocking the light leakage itself through the space between the mold frame (300) and the light guide unit (200).

Furthermore, since the shielding portion (230) is formed by ink rather than an independent members in the light guide unit (200) under the present invention, there is no need to change the structure of the light guide unit (200) and there is an advantage to utilize without changing the current mold frame (300) structure.

Continuously as reference to FIGS. 7 and 8, a modified shielding portion (230) is suggested according to the present invention as follows.

Figure 7:
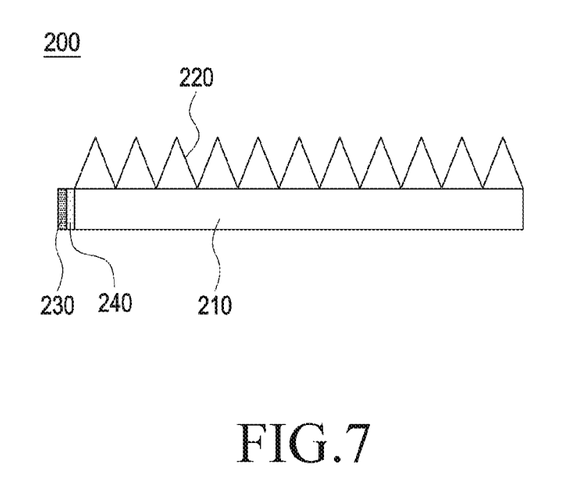
FIG. 7 is a schematic diagram disclosing a shielding portion and an additional reflector in the light guide unit in FIG. 1.
Figure 8:
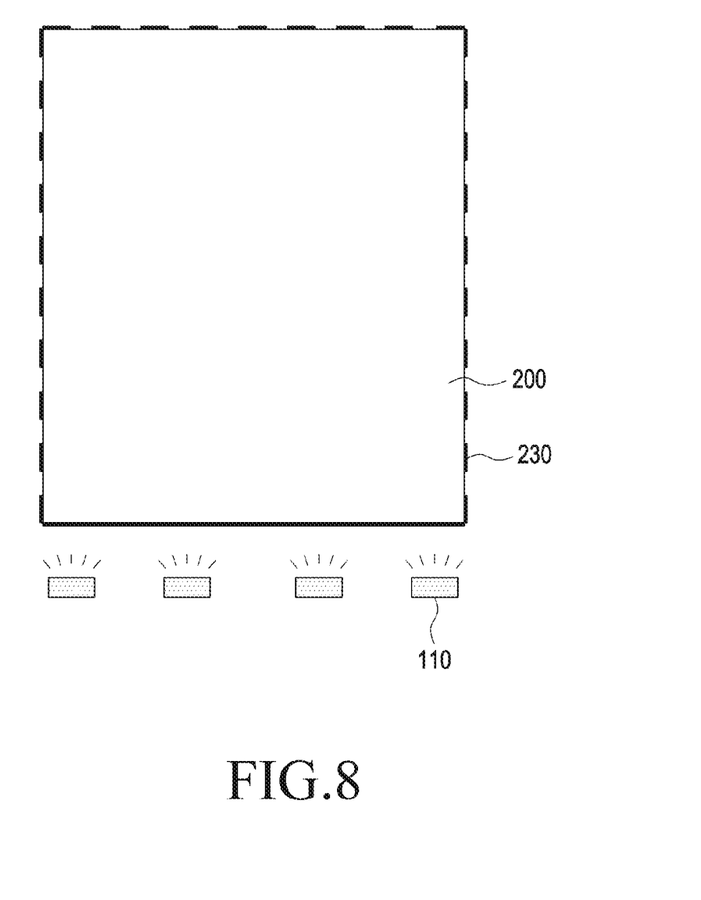
FIG. 8 is a schematic diagram showing a shielding portion is formed at a certain portion of the side of the light guide unit in FIG. 1.

FIG. 7 is a drawing showing an addition of a separate reflector (240) with a shielding portion (230) in the light guide unit (200) of FIG. 1 and FIG. 8 discloses the shielding portion (230) formed on a certain side of the light guide unit (200) of FIG. 1.

At first, in FIG. 7, the shielding portion (230) is formed at the side of the base film (210) and a separate reflector (240) further is placed between the base film (210) and the shielding portion (230).

Specifically, a reflective surface of the reflector (240) is formed at the side of the base film (210) so that the transmitted light is reflected to the base film (210).

Accordingly, the reflector (240) can not only prevent the light leakage through the side of the base film (210), but also improve the light efficiency by recycling the light.

Therefore, the reflectors (240) are formed first before the shielding portion (230) is formed at the side of the base film (210), and then the shielding portion (230) is formed and hardened thus the reflectors (240) and the shielding portion (230) are stably formed.

In the present embodiment, the reflector (240) may be formed with silver (Ag), but it can be formed with the material with high reflectivity.

Here, the shielding portion (230) is formed with color ink as described above.

In contrary, in FIG. 8, unlike the above mentioned embodiment, the shielding portion (230) is formed with a multiple constant pattern along the side of the base film not formed in an entire area but placed apart.

Specifically, a plurality of the shielding portions (230) may be disposed apart along the side of the base film (210) and the size and spacing of the shielding portion (230) may be varied depending on its characteristics.

In particular, although it is not illustrated on the drawings, the shielding portion (230) may be formed in such a way that the adhesion space becomes smaller and farther away from the light source (110).

As such, according to the present invention, the light guide unit (200) may additionally contain the reflectors (240) or the shielding portion (230) may be formed to have a specific pattern.

Next, referring to FIGS. 9 to 12, a method of manufacturing the light guide unit (200) where the shielding portion (230) is formed according to the preferred embodiment of the present invention.

Figure 9:
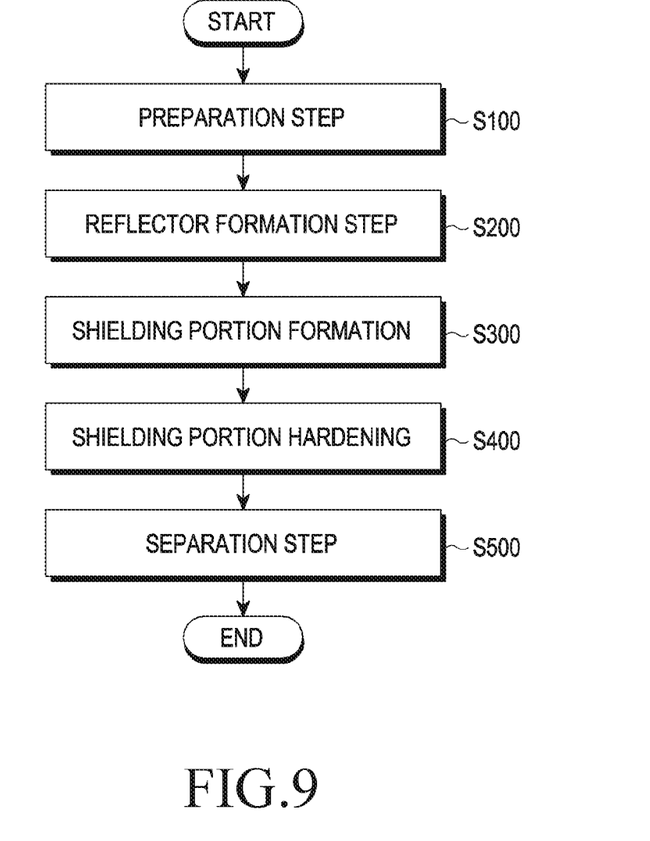
FIG. 9 is a flow chart describing a step to manufacture a light guide unit according to embodiments of the present invention.
Figure 10:
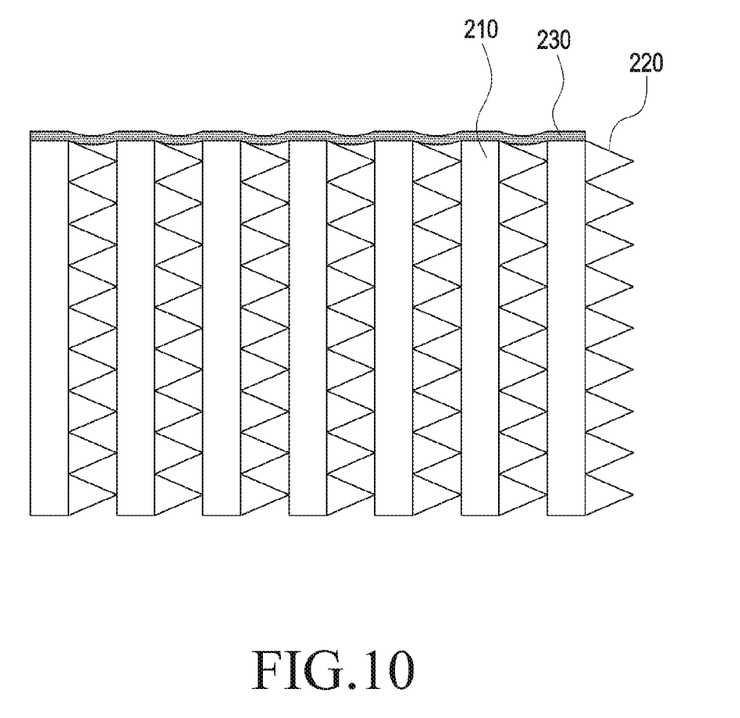
FIG. 10 is a schematic diagram showing the formation of a shielding portion formed at the side of a plurality of the light guide units according to the manufacturing step in FIG. 9.

FIG. 9 is a flow chart showing the manufacturing process of the light guide unit (200) according to the embodiment of the present invention and FIG. 10 is a drawing showing the shielding portion (230) formed at the side of a plurality of the light guide units (200) in the manufacturing process of FIG. 9.

Figure 11:
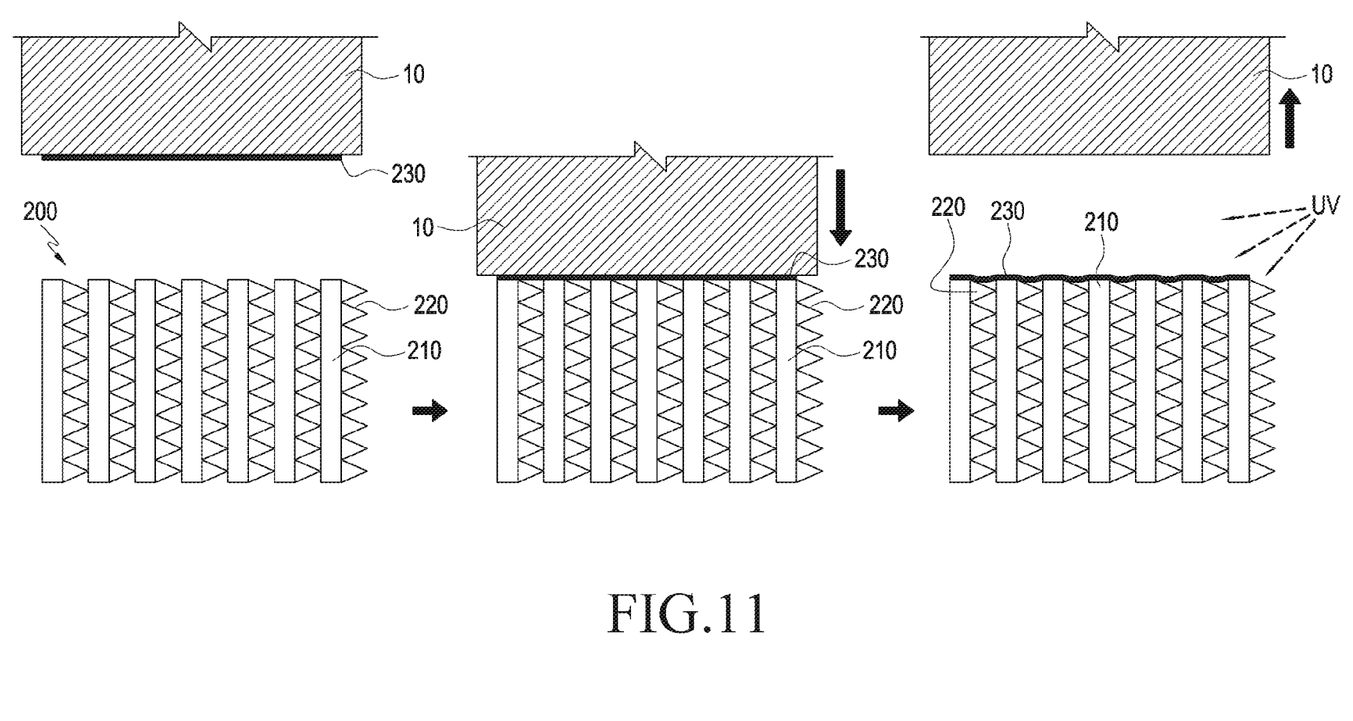
FIG. 11 is a schematic diagram showing a step of the formation of a shielding portion in the light guide unit in FIG. 10.
Figure 12:
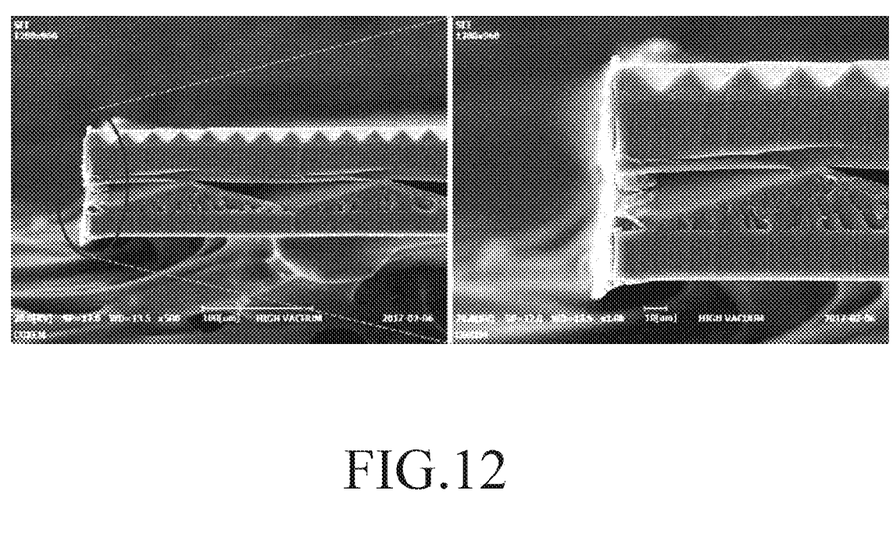
FIG. 12 is an image of a scanning electron microscope taken at the separation part of the light guide units in FIG. 10.

In addition, FIG. 11 is a drawing showing the formation of the shielding portion (230) in the light guide unit (200) in FIG. 10 and FIG. 12 is an image of the scanning electron microscope where a plurality of the light guide units (200) are separated in fashion in FIG. 10.

The manufacturing process of the light guide unit (200) where the shielding portion (230) is formed under the present invention includes a preparation step (S100), a reflector formation step (S200), a shielding portion formation step (S300), a shielding portion hardening step (S400), and a separation step (S500).

For the preparation step (S100), a plurality of the light guide units (200) with the structured pattern (220) are consecutively formed and layered.

Specifically, the light guide unit (200) stated above has a structured pattern (220) formed on the top or bottom of the base film (210), and by stacking a plurality of the light guide units (200) there is a separation among the base films (210).

The light guide unit (200) may comprise the diffuser sheet and the light condensing sheet. In the present embodiment, the light condensing sheet comprising the structured pattern (220) with a prism shape is explained as a reference.

As such, the preparation step (S100) is to form the light guide units (200) stacked to have a certain thickness.

The reflector formation step (S200) is to form a separate reflector (240) at the side of the light guide unit (200) laminated in the preparation step (S100).

Here, the reflector (240) includes a material such as silver as described above and is formed on a plurality of the base films by consecutive formation on the side of the base films (210) and subsequently the shielding portion formation step (S300) is performed.

For the shielding portion formation step (S300), a plurality of the shielding portions (230) are formed consecutively on the side of the light guide unit (200).

Specifically, the shielding portion formation step (S300) may be processed after the reflector formation step (S200) and may be applied in the form of overlaying with the reflector (240) formed on the side of the base film (210).

In this case, the shielding portion (230) may be formed at the side of the base film (210) in liquid state or in semi-hardening state.

In more details, for observing a process for the shielding portion (230) being formed at the side of the base film (210), it is formed through an independent formation device (10), as illustrated in FIG. 11.

Here, the formation device (10) contacts with the side of the base film (210) while a side of the formation device (10) is attached to the shielding portion (230) with a preset size.

In this case, a plurality of the light guide units (200) are disposed in stacked structure with a plurality of sheets. Accordingly, a plurality of the light guide units (200) are arranged in a layered form because of the structured pattern (220) formed on each of the base film (210).

And, when the formation device (10) is removed again after the formation device (10) disposed as such contacted with the side of the light guide unit (200), the shielding portion (230) is separated from the formation device (10) and formed continuously to the side of the multiple light guide units (200).

Here, where the light guide units (200) are placed with multiple laminated units, as described above, the base film (210) is placed with the separation and then the shielding portion (230) is formed at the side of the base films (210).

As a result, since the shielding portion (230) is not hardened during the formation, some are penetrated into a space among the layered light guide units (200) thereby its thickness is relatively smaller than its surrounding area.

Meanwhile, in the present invention, the light guide unit (200) may consist of multiple sheets with the structured pattern (220) laminated, and if the shielding portion (230) is formed to the side of the light guide unit (200), it may be expected that the shielding portion (230) is penetrated and hardened among the structured patterns (220) and thus an adhesion strength among the multiple sheets is increased.

The shielding portion hardening step (S400) for the light guide unit (230) is processed after the shielding portion formation step (S300).

The shielding portion hardening step (S400) is a process for fully hardening the shielding portion (230) by illuminating UV light to the shielding portion (230) composed of photopolymer resin, or by applying heat on the shielding portion (230) composed of thermosetting resin.

In this case, some of the shielding portion (230) penetrate into the space among the base films (210) and hardens the area with a relatively smaller thickness.

Subsequently, in the separation step (S500), a plurality of the light guide units (200) are separated each other.

In this case, the shielding portion (230) has been hardened while the light guide units (200) are formed. However, some of the shielding portion (230) penetrates into the space among the base films (210) and hardens the area with a relatively smaller thickness.

Therefore, when the light guide units (200) are separated, the separation occurs at the side of the structured pattern (220) formed where the shielding portion (230) with relatively thin with respect to the base film (210).

As such, when the light guide units (200) are separated, the shielding portion (230) is separated not from the side of the base film (210) but at the structured pattern position thus the shielding portion (230) formed on the base film (210) can be maintained the formation status without loss.

Meanwhile, in case where the light guide unit (200) is configured as a plurality of sheets formed with the structured pattern (220) laminated, it is possible to separately use the laminated sheet with the structured pattern (220) as a set after the shielding portion (230) is hardened.

In the light guide unit (200) manufactured by the process as such, as showing in FIG. 12, some of the shielding portion (230) is formed not only at the side of the base film (210) but also at the side of the structured pattern (220) when a real backlight module is manufactured.

Specifically, FIG. 12 discloses an image of the layered light guide units (200) taken by a scanning electron microscope and it is found that the shielding portion (230) is formed at the side of the base film (210).

As such, the shielding portion (230) is formed at the side of the light guide unit (200) to prevent the light from the light emitting unit (100) from leaking through the side of the base film (210), and further preventing the light from leaking outside through the space apart from the mold frame (300).

The preferred embodiment according to the present invention is described above. It is apparent to a person of the ordinary skilled in the art that this invention can be embodied in a specific form without deviating from its purpose or scope in question. Therefore, the detailed embodiments should be considered as exemplary, not limited to, and this invention may change within the scope of the claim attached and within its equivalence, not limited to the above-mentioned descriptions.

The invention claimed is:

1. A backlight module comprising:
   a light emitting unit including a light source and a light guide plate transmitting light from said light source to an upper part of the light guide plate;
   a light guide unit placed above said light emitting unit and transmitting light from a bottom part of the light guide unit to an upper part of the light guide unit;
   a mold frame containing said light emitting unit and said light guide unit and said mold frame formed to be apart from a side of said light guide unit; and
   a shielding portion formed at the side of said light guide unit preventing a light leakage transmitted from the side of said light guide unit to an outside of said light guide unit,
   wherein the light guide unit comprises a plurality of sheets each having a base film and a structured pattern on the base film, and
   wherein the shielding portion has a first part penetrating and contacting the structured pattern, a second part contacting the base film, and the first part is thinner than the second part.

2. The backlight module of claim 1, wherein said shielding portion is formed on a side of at least one of the plurality of the sheets.

3. The backlight module of claim 2, wherein said light guide unit comprises at least one of a light condensing sheet condensing light from a bottom part of the light condensing sheet and then transmitting to an upper part of the light condensing sheet, or a diffuser sheet diffusing light from a bottom part of the diffuser sheet and transmitting to an upper part of the diffuser sheet.

4. The backlight module of claim 2, wherein said light guide unit comprises a plurality of sheets where the structured pattern is formed on a side of the plurality of the sheets and the plurality of the sheets are laminated each other.

5. The backlight module of claim 4, wherein said shielding portion is a portion penetrated and hardened at a space formed between said structured patterns of the plurality of the sheets.

6. The backlight module of claim 1 further comprising; a reflector disposed between said shielding portion and the side of said light guide unit, wherein said reflector reflects light transmitted from a bottom part of said light guide unit to an inside of said light guide unit.

7. The backlight module of claim 1, wherein said shielding portion contains a color ink inside and shields leakage light from a side of said light guide unit to an outside of said light guide unit.

8. The backlight module of claim 1, wherein said shielding portion is formed at a certain portion along the side of said light guide unit.

9. The backlight module of claim 1, wherein said shielding portion comprises a photopolymer resin or a thermosetting resin.

10. A light guide unit comprising;
    a base film formed as a flat plate and having a preset thickness;
    a structured pattern formed on either a top surface or a bottom surface of said base film, wherein said structured pattern either condenses or diffuses light transmitted from a bottom part of said base film; and
    a shielding portion formed at a side of said base film, wherein said shielding portion prevents a leakage of light transmitted from a side of said base film to an outside of said base film,
    wherein said light guide unit comprises a light source and light guide plate transmitting light from said light source to an upper part of the light guide plate, and
    wherein the shielding portion has a first part penetrating and contacting the structured pattern, a second part contacting the base film, and the first part is thinner than the second part.

11. The light guide unit of claim 10 further comprising;
    a reflector formed between shielding portion and the side of said base film, wherein said reflector reflects light transmitted from a bottom part of said base film to an inside of said base film.

12. The light guide unit of claim 10, wherein said shielding portion contains a color ink inside and shields leakage light from the side of said shielding portion to an outside of said shielding portion.

13. The light guide unit of claim 10, wherein said shielding portion is formed at a certain portion along the side of said base film.

14. The light guide unit of claim 10, wherein said shielding portion comprises a photopolymer resin or a thermosetting resin.

15. A method for manufacturing a light guide unit comprising a step of;
- a preparation step for accumulatively placing a plurality of light guide units formed with a structured pattern;
- a shielding portion formation step for consecutively forming a shielding portion at a side of the plurality of said light guide units;
- a shielding portion hardening step for hardening said shielding portion; and
- a separation step for separating the plurality of said light guide units in which said light shielding portion is hardened respectively,
- wherein the light guide unit comprises a plurality of sheets each having a base film and a structured pattern on the base film, and
- wherein the shielding portion has a first part penetrating and contacting the structured pattern, a second part contacting the base film, and the first part is thinner than the second part.

16. The method for manufacturing the light guide unit of claim 15 further comprising a step of;
- a reflector formation step for forming a reflector at said side of said light guide unit accumulatively placed at said preparation step.

17. The method for manufacturing the light guide unit of claim 15, wherein said preparation step is to place said shielding portion with a preset size to a forming device wherein a side of said light guide unit contacts with said forming device each other thereby transposing and forming the shielding portion.

* * * * *